3,150,081
METHOD OF PREVENTING PRECIPITATION OF IRON COMPOUNDS FROM AN AQUEOUS SOLUTION

John Harris Haslam, Landenberg, Pa., assignor to E. I. du Pont de Nemours and Company, Wilmington, Del., a corporation of Delaware
No Drawing. Filed Aug. 14, 1962, Ser. No. 216,755
1 Claim. (Cl. 210—58)

This invention relates to an iron solubilizing agent and more specifically, to a method for preventing the precipitation of basic iron compounds from solutions having a pH of 4 to 9.

It is well known that iron and particularly ferric iron can be retained in solution only if the solution is strongly acid. For example, a ferric sulfate solution will precipitate ferric hydroxide if, by dilution or by the addition of an alkaline material, the acidity is decreased to a pH above about 3. In certain practical operations, such as in the treatment of oil wells to improve oil recovery, it is desirable to keep the iron in solution under less acid, neutral or even alkaline conditions.

One way of preventing the precipitation of iron in solutions at a pH above 3 is to add certain chelating agents which react with the iron to form stable, difficultly hydrolyzable iron chelates. Thus, the iron chelate of ethylenediaminetetraacetic acid is used to supply nutrient iron to plants growing in alkaline soils. Plants growing in alkaline soils often develop chlorosis due to iron deficiency, not because iron is absent in the soil but because under these alkaline conditions it is in an insoluble form. Iron ethylenediaminetetraacetate resists hydrolysis and when added to the soil supplies to the plants their required iron in soluble form.

A chemically related problem exists in connection with efforts to prevent the precipitation of ferric hydroxide in water floods in oil recovery operations. In secondary oil recovery operations water is pumped into the oil bearing strata to float and collect the remaining oil so that it can be pumped from adjacent wells. Very large quantities of water are usually required, and obtaining an adequate source for this water is often a problem. Brines from deep wells, fresh water from streams and lakes and sea water can be used. Water pumped up with the oil is separated and recycled, and in many cases water from several sources is utilized. Often the water from one or more of these sources contains appreciable amounts of iron, and during mixing with water from other sources or by reaction with the rock, ferric hydroxide is precipitated. This gelatinous material collects in the oil bearing strata resulting in gradual plugging so that it becomes increasingly difficult to introduce the necessary quantity of water. Citric acid has been suggested as a remedy for this difficulty since ferric citrate is a stable chelate which resists hydrolysis even at high pH.

Other examples of desirable solubiliziation of iron are to be found in various hydrometallurgical separations in which it is desired to retain iron in solution while another metal or metal compound is being precipitated.

It is an object of this invention to provide a new method and composition for solubilizing iron. Another object is to provide a method and composition for preventing the precipitation of basic iron compounds at a pH above 3 or even from non-acidic aqueous solutions. Still another object of this invention is to provide a composition for solubilizing iron which is less expensive than those heretofore available.

Generally, the objects of this invention are accomplished by substituting an expensive polycarboxylic hydroxy acid with a cheap monocarboxylic acid. Specifically, an aqueous composition is provided in which iron is chelated with citrate and hydroacetate ions. The hydroxyacetic acid which can be represented as $$HOCH_2COO^-$$

ions and citric acid may be present in the solutions in the form of water-soluble salts, the resultant mixtures being hydrolytically stable even when the solutions are non-acidic. Usually, however, the acids are present at a pH which indicates partial conversion to a salt, e.g., a pH of from 4 to 9. A base such as NaOH, KOH or $NH_3OH$ can be used to keep the pH within the cited range.

Hydroxyacetic acid alone has no effective solubilizing action on ferric iron at a pH of more than 3 in processes of the kind here involved. Citric acid, on the other hand, forms with ferric iron a very stable chelate which resists hydrolysis even under strongly alkaline conditions and retains the iron in solution. Citric acid is, however, relatively expensive.

Unexpectedly, it is discovered according to this invention that mixtures of hydroxyacetic acid and citric acid used in the proportions described in this invention dissolve more iron than can be dissolved by the same amount of the acids used separately to dissolve the iron. Moreover, hydroxyacetic acid can be substituted for up to about 70% of the amount of citric acid required to solubilize ferric iron without producing a less stable solution. Since hydroxyacetic acid is considerably less expensive than citric acid, a substantial economic saving can thus be realized. In one embodiment of the invention, the citrate and hydroxyacetate ions are present in admixture with an iron compound which would be precipitated at a pH of 4 to 9 had there been no chelating agent present, and the quantity of hydroxyacetic acid and citric acids introduced is such as to maintain the pH at 4 to 9, the iron being thus retained in solution.

The following example will illustrate the present invention, it being understood that this invention is not limited by the details of this example:

Example 1

Six tenths of a ml. of a 0.1 M citric acid solution is added to 100 ml. of distilled water. One ml. of a 0.05 M ferric sulfate, $Fe_2(SO_4)_3$, solution is added and the solution brought to pH 7 with 0.1 N sodium hydroxide solution. This solution showed a slight Tyndall beam but did not precipitate on standing for several months. This was used as a reference standard to indicate borderline solubilization of iron, and the amounts of various mixtures of hydroxyacetic acid and citric acid required to produce a Tyndall beam of equivalent intensity under identical conditions were determined.

These results were as follows:

| Mol ratio, hydroxyacetic/citric | Weight ratio hydroxyacetic/citric | Total lbs. required per lb. of iron |
|---|---|---|
| 0/100 | 0/100 | 2.05 |
| 20/80 | 9/91 | 2.10 |
| 40/60 | 22/78 | 1.93 |
| 60/40 | 37/63 | 1.97 |
| 80/20 | 61/39 | 1.95 |
| 90/10 | 78/22 | 3.12 |
| 95/5 | 88/12 | 4.10 |
| 98/2 | 95/5 | 8 |
| 100/0 | 100/0 | Infinity |

It is apparent from the foregoing that the most effective mol ratio of hydroxyacetic acid:citric acid in practical operations, is from 40/60 to 80/20.

Example 2

Under the same conditions described in Example 1 the amount of citric acid and various citric acid-hydroxyacetic acid mixtures necessary to give no Tyndall beam (i.e. full solubilization) at pH 7 was determined.

These results were as follows:

| Mol ratio, hydroxyacetic/ citric | Weight ratio, hydroxyacetic/ citric | Total lbs. of mixed acid required/lb. iron |
|---|---|---|
| 0/100 | 0/100 | 2.75 |
| 25/75 | 12/78 | 2.91 |
| 50/50 | 28/72 | 3.11 |
| 75/25 | 54/46 | 3.93 |
| 85/15 | 77/23 | 4.15 |

In to an oil well in a field which has been virtually depleted of oil, an aqueous solution having a concentration of 250 p.p.m. of citric acid and 250 p.p.m. of hydroxyacetic acid is pumped until other wells in the field are enabled to pump additional oil. Although this solution contained a considerable amount of dissolved iron there is no evidence of precipitation and plugging of the strata, and no difficulty is encountered in pumping this solution into the strata over a six month period. Experience with other wells indicates that water containing iron would have caused gradual plugging and increasing difficulty in pumping an adequate quantity into the strata. It is believed that the citric and hydroxyacetic acids added prevents this difficulty.

Example 3

Six tenths of a pound of citric acid is added to a solution of distilled water containing one pound of iron at a concentration of 0.003%. The solution is brought to pH 4 with 0.1 N sodium hydroxide solution. The solution is stirred. Precipitation of the iron is noted.

Example 4

The solution of Example 3 is brought to a pH of 6.5 with the addition of more 0.1 N sodium hydroxide solution. The solution is stirred. The precipitation of the iron is again noted.

Example 5

The solution of Example 3 is brought to a pH of 9 with the addition of more 0.1 N sodium hydroxide solution. The solution is stirred. The precipitation of the iron is again noted.

Example 6

One pound of hydroxyacetic acid is added to a solution of distilled water containing one pound of iron at a concentration of 0.003%. The solution is brought to a pH of 4 with 0.1 N sodium hydroxide solution. The solution is stirred. The precipitation of the iron is noted.

Example 7

The solution of Example 6 is brought to a pH of 6.5 with the addition of more 0.1 N sodium hydroxide solution. The solution is stirred. The precipitation of the iron is again noted.

Example 8

The solution of Example 6 is brought to a pH of 9 with the addition of more 0.1 N sodium hydroxide solution. The solution is stirred. The precipitation of the iron is again noted.

Example 9

Six tenths of a pound of citric acid and one pound of hydroxyacetic acid is added to a solution of distilled water containing one pound of iron at a concentration of 0.003%. The solution is brought to a pH of 4 with 0.1 N sodium hydroxide solution. The solution is stirred. No precipitation of iron is noted even after standing for two hours.

Example 10

The solution of Example 9 is brought to a pH of 6.5 with the addition of more 0.1 N sodium hydroxide solution. The solution is stirred. No precipitation of iron is noted even after two hours of standing.

Example 11

The solution of Example 9 is brought to a pH of 9 with the addition of more 0.1 N sodium hydroxide solution. The solution is stirred. No precipitation of iron is noted even after standing for two hours.

Example 12

Seven hundred and sixty pounds of hydroxyacetic acid is added to a solution of distilled water containing one pound of iron at a concentration of 0.003%. The solution is brought to a pH of 4 with 0.1 N sodium hydroxide solution. The solution is stirred. The precipitation of the iron is noted.

Example 13

The solution of Example 12 is brought to a pH of 6.5 with the addition of more 0.1 N sodium hydroxide solution. The solution is stirred. The precipitation of the iron is again noted.

Example 14

The solution of Example 12 is brought to a pH of 9 with the addition of more 0.1 N sodium hydroxide solution. The solution is stirred. The precipitation of the iron is again noted.

Example 15

Two and one tenth pounds of hydroxyacetic acid is added to a solution of distilled water containing one pound of iron at a concentration of 0.001%. The solution is brought to a pH of 4 with 0.1 N sodium hydroxide solution. The solution is stirred. The precipitation of the iron is noted.

Example 16

The solution of Example 15 is brought to a pH of 6.5 with the addition of more 0.1 N sodium hydroxide solution. The solution is stirred. The precipitation of the iron is again noted.

Example 17

The solution of Example 15 is brought to a pH of 9 with the addition of more 0.1 N sodium hydroxide solution. The solution is stirred. The precipitation of the iron is again noted.

Example 18

Five tenths of a pound of citric acid is added to a solution of distilled water containing one pound of iron at a concentration of 0.001%. The solution is brought to a pH of 4 with 0.1 N sodium hydroxide solution. The solution is stirred. The precipitation of the iron is noted.

Example 19

The solution of Example 18 is brought to a pH of 6.5 with the addition of more 0.1 N sodium hydroxide solution. The solution is stirred. The precipitation of the iron is again noted.

Example 20

The solution of Example 18 is brought to a pH of 9 with the addition of more 0.1 N sodium hydroxide solution. The solution is stirred. The precipitation of the iron is again noted.

Example 21

Two and one tenth pounds of hydroxyacetic acid plus 0.5 pound of citric acid is added to a solution of distilled water containing one pound of iron at a concentration of 0.001%. The solution is brought to a pH of 4 with 0.1 N sodium hydroxide solution. The solution is stirred.

No precipitation of the iron is noted even after two hours of standing.

Example 22

The solution of Example 21 is brought to a pH of 6.5 with the addition of more 0.1 N sodium hydroxide solution. The solution is stirred. No precipitation of the iron is noted even after two hours of standing.

Example 23

The solution of Example 21 is brought to a pH of 9 with the addition of more 0.1 N sodium hydroxide solution. The solution is stirred. No precipitation of the iron is noted even after two hours of standing.

Example 24

One pound of citric acid is added to a solution of distilled water containing one pound of iron at a concentration of 0.001%. The solution is brought to a pH of 4 with 0.1 N sodium hydroxide solution. The solution is stirred. The precipitation of the iron is noted.

Example 25

The solution of Example 24 is brought to a pH of 6.5 with the addition of more 0.1 N sodium hydroxide solution. The solution is stirred. The precipitation of the iron is again noted.

Example 26

The solution of Example 24 is brought to a pH of 9 with the addition of more 0.1 N sodium hydroxide solution. The solution is stirred. The precipitation of the iron is again noted.

Example 27

Six tenths of a pound of hydroxyacetic acid is added to a solution of distilled water containing one pound of iron at a concentration of 0.001%. The solution is brought to a pH of 4 with 0.1 N sodium hydroxide solution. The solution is stirred. The precipitation of the iron is noted.

Example 28

The solution of Example 27 is brought to a pH of 6.5 with the addition of more 0.1 N sodium hydroxide solution. The solution is stirred. The precipitation of the iron is again noted.

Example 29

The solution of Example 27 is brought to a pH of 9 with the addition of more 0.1 N sodium hydroxide solution. The solution is stirred. The precipitation of the iron is again noted.

Example 30

Six tenths of a pound of hydroxyacetic acid and one pound of citric acid is added to a solution of distilled water containing one pound of iron at a concentration of 0.001%. The solution is brought to a pH of 4 with 0.1 N sodium hydroxide solution. The solution is stirred. No precipitation of the iron is noted even after two hours of standing.

Example 31

The solution of Example 30 is brought to a pH of 6.5 with the addition of more 0.1 N sodium hydroxide solution. The solution is stirred. No precipitation of the iron is noted even after two hours of standing.

Example 32

The solution of Example 30 is brought to a pH of 9 with the addition of more 0.1 N sodium hydroxide solution. The solution is stirred. No precipitation of iron is noted even after two hours of standing.

The solutions described in Example 1 were found to be quite stable under various conditions. These mixtures were stored in contact with excess calcium carbonate for several weeks. No precipitation occurred indicating that limestone would not destroy the solubilizing effect of the hydroxyacetic acid-citric acid mixtures.

Other stability tests were made in concentrated sodium chloride solutions and these gave substantially the same results as were obtained in the absence of sodium chloride. This indicates that the iron would be effectively solubilized in brines.

Heating at steam bath temperature did not cause precipitation of the iron. Solutions described in Example 1 were heated on a steam bath for eight hours with no precipitation and substantially no increase in Tyndall beam intensity.

In certain applications wherein bacteria or molds may attack or destroy hydroxyacetic acid and citric acid, thus causing iron precipitation, bactericides can be added to the solutions.

It is to be understood that by the addition of different amounts of hydroxyacetic acid-citric acid mixtures iron can be solubilized to varying degrees from completely soluble iron as evidenced by no Tyndall beam to border line or partially insoluble iron, as evidenced by the presence of a Tyndall beam. Such partially insoluble iron might be satisfactory for some applications, such as water floods, since the requirement in this case is merely that no ferric hydroxide precipitate in flocculent form be present, since this clogs and plugs the oil bearing strata. Other applications require complete solubilization of iron, where a solution which remains stable indefinitely is required. Those solutions initially showing a more intense Tyndall beam precipitate ferric hydroxide on standing for a day or two, and are useful in applications where temporary partial solubilization is sufficient for the purposes at hand, as for example, in cleaning rust from metal surfaces and the like.

This application is a continuation-in-part of my application Serial No. 783,673, filed December 30, 1958, now abandoned.

The invention claimed is:

The method of preventing the precipitation of basic iron compounds from an aqueous solution containing iron at a pH of 4 to 9, comprising adding to said solution citrate and hydroxyacetate radicals in a mole ratio respectively of from 60:40 to 20:80.

References Cited in the file of this patent

UNITED STATES PATENTS 2,664,441     Owens et al. _____ Dec. 29, 1953

OTHER REFERENCES

Thorstensen et al.: J. Am. Leather Chemists Assoc., 44, 841–69 (1949). (Copy in Pat. Off. Sci. Lib.)